(12) United States Patent
Huang

(10) Patent No.: US 10,973,179 B2
(45) Date of Patent: Apr. 13, 2021

(54) LIVE PLANT CONTAINER

(71) Applicant: Jerry Huang, Richmond (CA)

(72) Inventor: Jerry Huang, Richmond (CA)

( * ) Notice: Subject to any disclaimer, the term of this patent is extended or adjusted under 35 U.S.C. 154(b) by 237 days.

(21) Appl. No.: 16/193,384

(22) Filed: Nov. 16, 2018

(65) Prior Publication Data

US 2020/0156860 A1     May 21, 2020

(51) Int. Cl.
*A01G 13/04* (2006.01)
*B65D 85/52* (2006.01)
*A01G 7/04* (2006.01)
*A01G 9/02* (2018.01)

(52) U.S. Cl.
CPC ............. *A01G 13/04* (2013.01); *A01G 7/045* (2013.01); *A01G 9/02* (2013.01); *B65D 85/52* (2013.01); *B65D 2205/02* (2013.01)

(58) Field of Classification Search
CPC ...... A01G 13/0212; A01G 13/04; A01G 9/02; A01G 7/045; B65D 85/52; B65D 2205/02
USPC ........................................................ 47/65, 84
See application file for complete search history.

(56) References Cited

U.S. PATENT DOCUMENTS

| | | | | |
|---|---|---|---|---|
| 2,160,998 A | * | 6/1939 | Wilson | B65D 85/52 47/84 |
| 2,664,670 A | * | 1/1954 | Mulford | B65D 75/54 47/84 |
| 2,767,831 A | * | 10/1956 | Brecht | B65D 5/0005 206/423 |
| 3,035,751 A | * | 5/1962 | Brown | B65D 85/52 47/84 |
| 3,058,585 A | * | 10/1962 | Budd | B65D 5/5028 206/423 |
| 3,127,011 A | * | 3/1964 | Weddle | B65D 85/505 206/423 |
| 3,314,194 A | * | 4/1967 | Halleck | B65D 85/52 47/69 |
| 4,075,786 A | * | 2/1978 | van Zyl | A01G 9/02 47/84 |
| 4,242,835 A | * | 1/1981 | Mondragon Sorribes | A01G 9/16 47/84 |
| 4,328,641 A | * | 5/1982 | Tesch | A01G 31/00 47/59 R |
| 4,330,059 A | * | 5/1982 | Freeman | B65D 5/5007 206/423 |
| 4,662,107 A | * | 5/1987 | Van Den Kieboom | B65D 85/52 47/72 |
| 4,829,707 A | * | 5/1989 | Koffler | A01G 13/04 47/2 |

(Continued)

FOREIGN PATENT DOCUMENTS

GB     1349001 A    *    3/1974   .............. A01G 9/18

*Primary Examiner* — Michael McCullough

(57) ABSTRACT

The present invention discloses a live plant container which is to be utilized when transporting plants from one location to another. The invention works on keeping the plant live and healthy during shipping and maintains the plant's vegetative or flowering growth cycle through controlled photoperiod light exposure. The main parts of the assembly include, an opaque tubular container body (TUBE) with an interior restriction flange, a top lid (LID-1) containing a battery powered light source on the bottom of the lid, a disc shaped propagation rooting medium retainer (RETAINER) and a bottom lid (LID-2) attaches to the bottom end of the TUBE.

4 Claims, 6 Drawing Sheets

(56) References Cited

U.S. PATENT DOCUMENTS

| | | | | |
|---|---|---|---|---|
| 4,936,046 | A * | 6/1990 | Miller | B65D 85/52 |
| | | | | 206/423 |
| 5,224,598 | A * | 7/1993 | Angeles | B65D 85/52 |
| | | | | 206/423 |
| 5,355,623 | A * | 10/1994 | Brown | A01G 13/0281 |
| | | | | 47/32 |
| 5,375,370 | A * | 12/1994 | Zimmerman | A47G 7/07 |
| | | | | 248/188 |
| 5,613,605 | A * | 3/1997 | Angeles | B65D 25/10 |
| | | | | 206/423 |
| 6,463,697 | B2 * | 10/2002 | Weder | B65D 81/05 |
| | | | | 211/74 |
| 6,968,948 | B2 * | 11/2005 | Scott | B65D 25/22 |
| | | | | 206/423 |
| D517,411 | S * | 3/2006 | Okimoto | D11/152 |
| D653,990 | S * | 2/2012 | Cherry | D11/164 |
| D741,743 | S * | 10/2015 | Steier | D11/164 |
| D812,519 | S * | 3/2018 | Macari | D11/164 |
| 10,179,694 | B2 * | 1/2019 | Fenner, Jr. | F21V 23/0414 |
| 2008/0276534 | A1 * | 11/2008 | Bissonnette | A01G 27/003 |
| | | | | 47/62 R |
| 2015/0313095 | A1 * | 11/2015 | Fenner, Jr. | A01G 7/045 |
| | | | | 47/84 |
| 2017/0086397 | A1 * | 3/2017 | Sutton | A01G 27/005 |
| 2018/0288948 | A1 * | 10/2018 | Croteau | A01G 9/20 |
| 2019/0327909 | A1 * | 10/2019 | Kong | B65D 85/52 |

\* cited by examiner

SECTION A-A

SECTION C-C

SECTION D-D

SECTION E-E

LIVE PLANT CONTAINER

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Field of the Invention

The field of the invention is containers for holding live plants, and more particularly, closed-system containers for holding live plants for transportation purposes and keep them alive and well for a long duration of time.

Description of the Related Art

All live plants require certain periods of exposure to light in order to stay alive. Furthermore, certain flowering plants require different photoperiods with longer light exposure vs darkness period to stay in a vegetative growth cycle. If the same flowering plant is exposed to prolonged periods of darkness, it will trigger the live plant to change into a flowering growth cycle.

Growers shipping their products to distant places encountered the difficulty of having the live plants arrive both alive and without damage. Currently, for the purpose of shipping a live plant, such as inside a card board box, the plant is in complete darkness for prolonged periods of time. This is detrimental to the health of the live plant and may alter its growth cycle (vegetative cycle or flowering cycle) and negatively affect its growth potential.

There are many inventions that have been found in prior art that have focused on developing multiple methods and procedures in this regard. For instance, Container for safely retaining a living plant during transit and display bearing U.S. Pat. No. 4,075,786A is issued to Zyl Bernard Van. The invention discloses a low-cost arrangement for displaying a small, rooted plant in a highly attractive manner, with such arrangement also serving as a moisture-retaining shipping container for the plant. The construction of the container is such that without modification from the mode used for displaying the plant, it can serve to hold the plant and a small quantity of associated earth in a safe and intact condition throughout a shipping procedure. This invention also includes a novel method of packaging a small living plant for display and/or shipment at minimal cost.

A U.S. Pat. No. 3,748,783A is a sealed live plant container and method is issued to A Sokolies. The patent discloses a live plant display assembly comprising a gas-impermeable hollow container sealed from ambient atmosphere and composed of a material transmitting light to a degree sufficient for photosynthesis having an ecologically balanced soil-animal-plant system capable of self-supporting life cycles therein.

A U.S. Pat. No. 6,968,948B2 is a container for holding live plants for display and sale for a long duration is issued to Walter Scott. The invention discloses a sealed container system for packaging and displaying a live plant for sale. The system has a subcontainer that is partially filled with a hydrogel or has a divider lid that separates the hydrogel from the rest of the container system. A lid covers the subcontainer, where the lid has a tapered or elongate lumen to accommodate the plant roots while preventing the leakage of the hydrogel. The clear or transparent container, with the hydrogel, allows the container to operate as a miniature greenhouse allowing the plant to be displayed for an extended period of time without the need for interventional care by a human.

Plant container bearing U.S. Pat. No. 6,637,155B1 is issued to Jason Trent Butler, Joel Freeman Butler. The patent discloses a cylindrical plant container having a dual sidewall and a bottom wall is provided. The inner sidewall is constructed of woven polypropylene fabric and the outer sidewall is constructed of wire, such as chicken wire. The inner sidewall extends above the outer sidewall and is folded over the top of the outer sidewall and is fastened thereto. The inner sidewall also extends below the outer sidewall and is folded over the bottom of the outer sidewall and is fastened thereto. The bottom wall is removably connected to the combined inner and outer sidewall. The bottom wall is of a non-woven polypropylene material. The present invention is designed to be used in a plant nursery. The woven polypropylene permits air to penetrate through the sidewall permitting air pruning of the roots proximal the sidewall. This forces the roots to grow in both a horizontal and downward fashion resulting in a denser plant root system with no spiraling or circling of roots within the cylindrical plant container. The heat transfer characteristics of the polypropylene reduces the root ball temperature compared to other containers. The non-woven polypropylene bottom draws moisture into the container and allows small roots to grow downwardly into the ground.

Plant container cover bearing U.S. Pat. No. 5,195,271A is issued to Bradley Jr James B. The patent discloses a plant container cover includes flexible sheet material that is conformable to the shape of the plant container. The sheet material includes an exterior and an interior side wall; parallel top and bottom edges, and first and second ends. The interior side wall is disposed adjacent to the plant container. A flexible covering is provided for the sheet material and is disposed adjacent to the exterior side wall of the sheet material for completely covering the exterior side wall. A fastener is provided for detachably interconnecting the covering to the sheet material. The fastener is disposed adjacent to the top and bottom edges of the sheet material. Additionally, a fastener is provided adjacent the ends of the flexible sheet material for selectively interconnecting the ends such that the flexible sheet material encircles the plant container.

Shipping of live plants with perforated plastic overwrap bearing U.S. Pat. No. 6,968,947B2 is issued to International Paper Co. The patent discloses the shipping system envelopes plants within their containers in perforated plastic. The perforations of the plastic are sized and spaced to allow respiration but to prevent the plant from becoming dislodged from their container. The container can be a tray having multiple cells holding a plurality of plants, or a single pot. The perforated plastic is used as an over wrap of the plant within its container. The plants are placed within a shipping container. Inserts are placed within the container and prevent the plant from becoming crushed if the shipping container becomes inverted by supporting the edge of the plant container and preventing the plant material from contacting any surface which would damage the plant.

A Container apparatus issued to Womick Michael S bearing U.S. Pat. No. 4,788,792A. The patent discloses a container apparatus provides separate support for floral decoration and live plants and has an outer container with encircling walls and a bottom with a center core of floral decoration supporting material positioned in a center container in the center of the outer container. A plurality of arcuate plant containers are positioned around the center core of floral decoration and center container for holding live plants and each supporting the center floral decoration supporting material and center container.

It is evident that a lot of damage and inconvenience would be obviated if some satisfactory means could be employed for transporting and retaining the plant can be employed. The current invention proposes to provide a new method and apparatus for the containment and transportation of a live plant (typically a young seedling) propagated in a rooting medium. Currently, for the purpose of shipping a live plant, such as inside a card board box, the plant is in complete darkness for prolonged periods of time. This is detrimental to the health of the live plant and may alter its growth cycle (vegetative cycle or flowering cycle) and negatively affect its growth potential. The current invention proposes to solve this problem, keeping the plant live and healthy during shipping, and maintain the plant's vegetative or flowering growth cycle through controlled photoperiod light exposure.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The primary desirable object of the present invention is to provide a novel and improved form of live plant container which can retain plant/s for longer period of time without effecting their well-being and growth cycle.

The primary objective of this invention is to provide a new and improved form of live plant container utilizing controlled photoperiod light exposure to maintain the plant's vegetative or flowering growth cycle.

It is also a principal object of this invention to provide a novel, attractive, and highly effective technique for enabling a small, rooted plant to be easily packaged for shipment in commerce, with the packaging arrangement being of such a nature as to assure that the plant will arrive at its destination in a healthy condition.

It is also the objective of the invention to provide a live plant holding assembly which is of low cost.

It is another objective of the invention to provide an assembly which is highly portable.

A still further object is to provide a plant container assembly that is economical in cost to manufacture.

It is a further object of the present invention to provide a new and improved form of live plant container which is of a durable and reliable construction.

Still yet another object of the present invention is to provide a new and improved live plant container which provides in the apparatuses and methods of the prior art some of the advantages thereof, while simultaneously overcoming some of the disadvantages normally associated therewith.

The invention has a further object to provide user with aesthetic satisfaction by showcasing a beautiful and smart design of live plant container.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

LIST OF FIGURES

Below is a brief description of each of the drawing figures presented:

DETAILED DESCRIPTION

Figure 1:
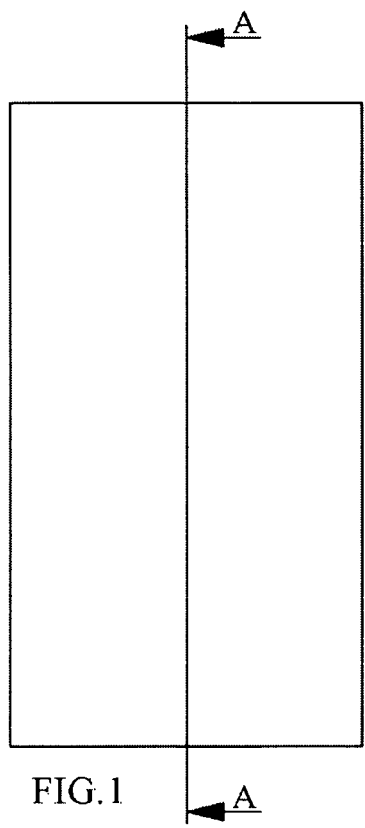
FIG. 1 is a front view of the opaque container body of the present invention.
Figure 2:
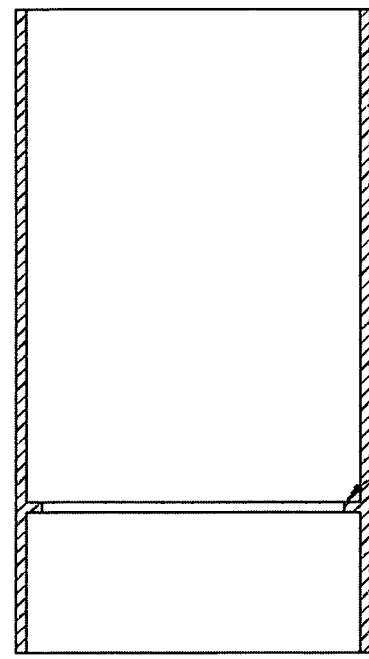
FIG. 2 is a side cross-sectional view (A-A) of the opaque container body of the present invention shown in FIG. 1.
Figure 3:
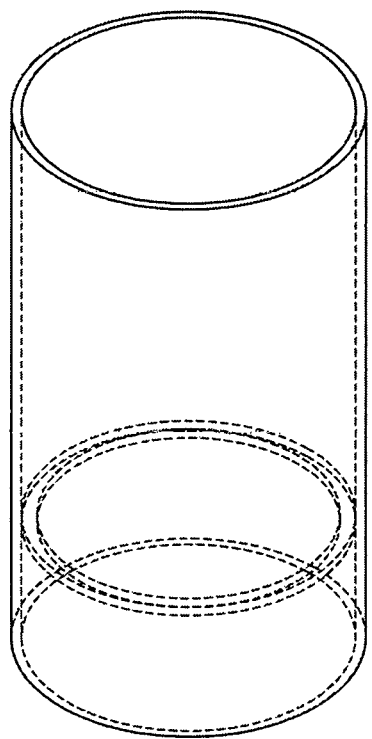
FIG. 3 is a front elevational view of the opaque container body of the present invention.
Figure 4:
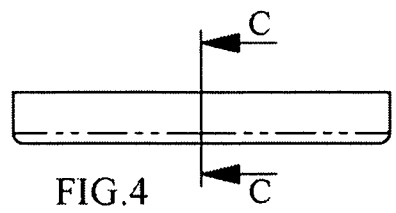
FIG. 4 is a front view of the bottom lid of the present invention.
Figure 5:
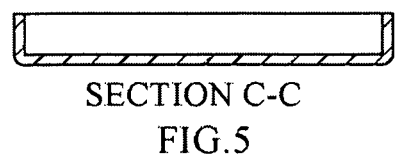
FIG. 5 is a side cross-sectional view (C-C) of the bottom lid of the present invention shown in FIG. 4.
Figure 6:
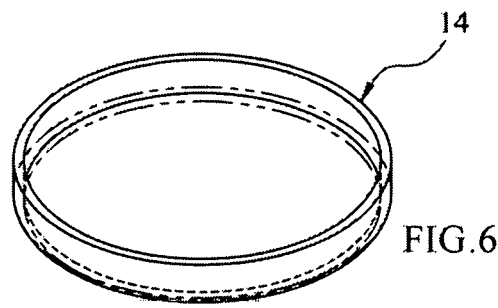
FIG. 6 is a front elevational view of the bottom lid of the present invention.
Figure 7:
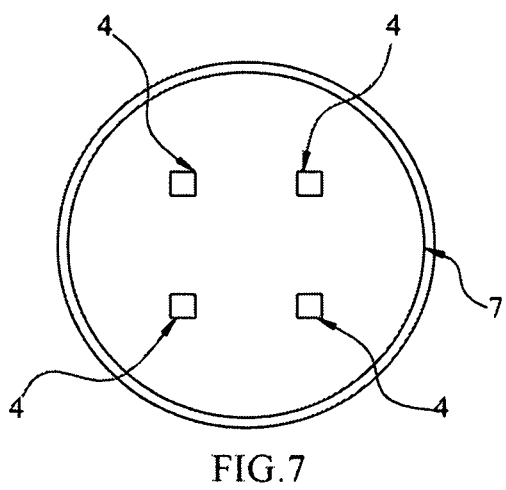
FIG. 7 is the bottom plan view of the top lid of the present invention.
Figure 8:
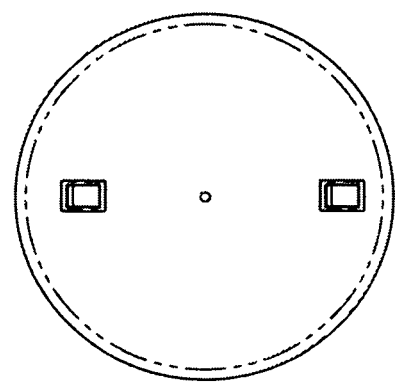
FIG. 8 is the top plan view of the top lid of the present invention.
Figure 9:
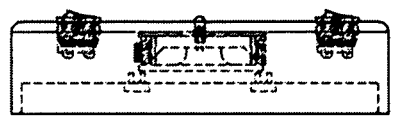
FIG. 9 is the front view of the top lid assembly of the present invention.
Figure 10:
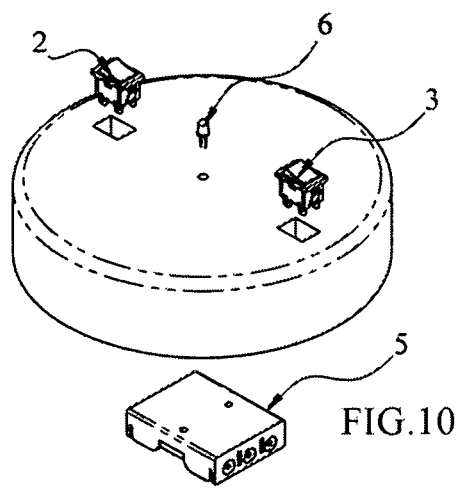
FIG. 10 is a front elevational view of the top lid assembly of the present invention including a battery box.
Figure 11:
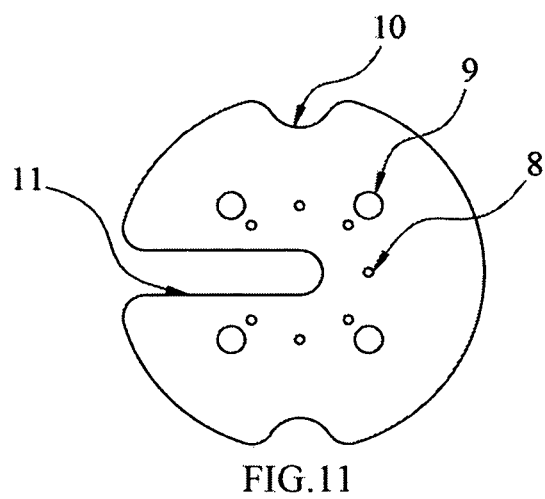
FIG. 11 is the bottom plan view of the propagation rooting medium retainer of the present invention.
Figure 13:
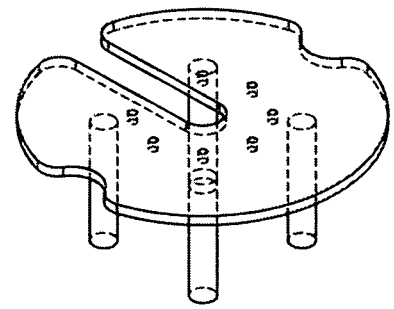
FIG. 13 is a front elevational view of the propagation rooting medium retainer of the present invention.
Figure 12:
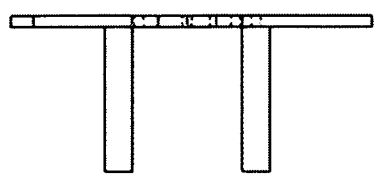
FIG. 12 is the front view of the propagation rooting medium retainer of the present invention.
Figure 14:
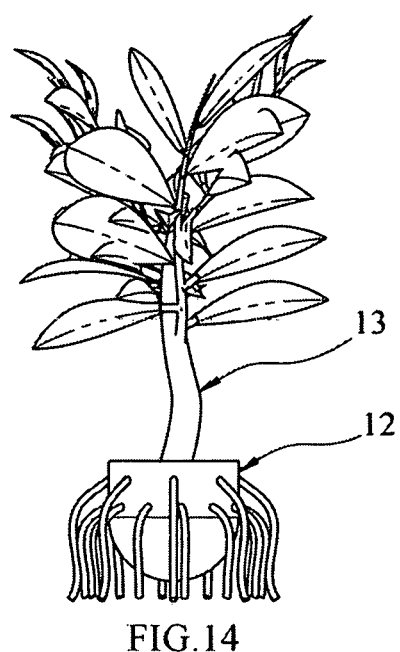
FIG. 14 is the front view of the example live plant to be contained in the present invention.
Figure 15:
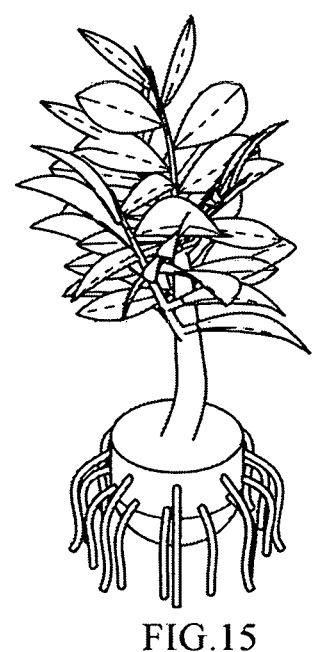
FIG. 15 is the front elevational view of the example live plant to be contained in the present invention.
Figure 16:
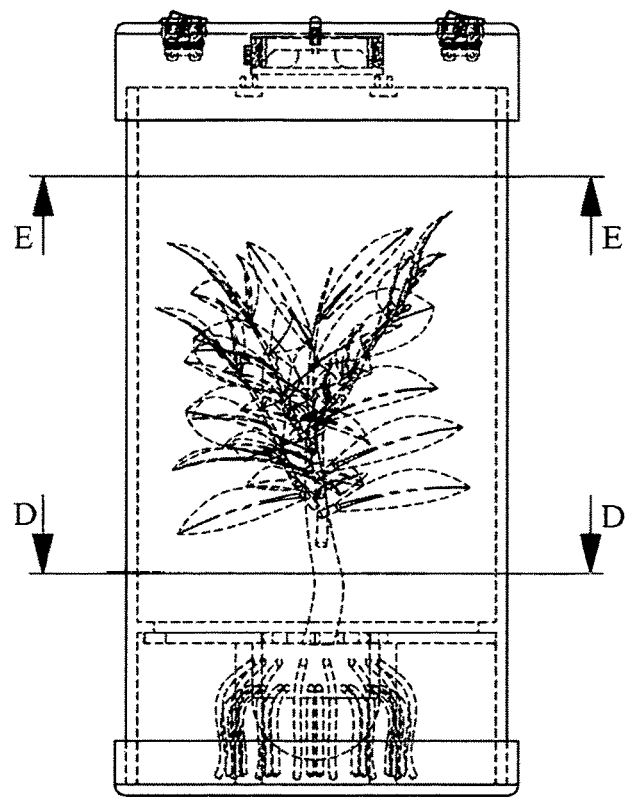
FIG. 16 is the front view of the present invention.
Figure 18:
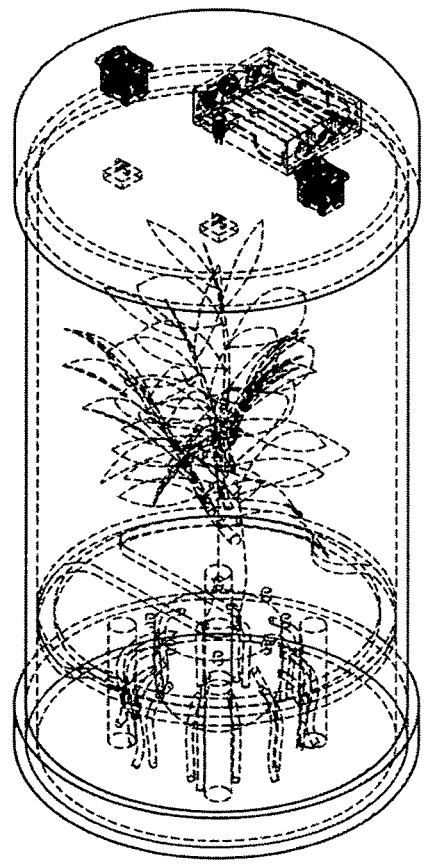
FIG. 18 is the front elevational view of the present invention.
Figure 17:
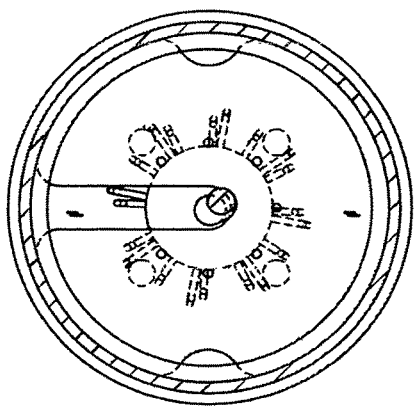
FIG. 17 is a top cross-sectional view (D-D) of the present invention shown in FIG. 16
Figure 19:
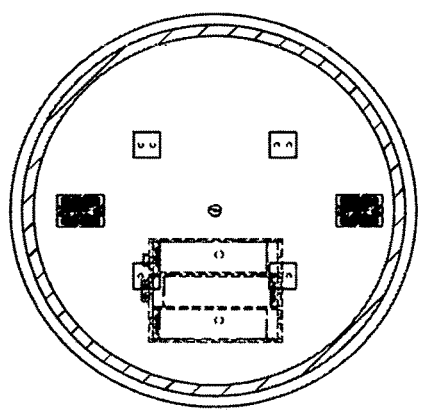
FIG. 19 is a bottom cross-sectional view (E-E) of the present invention shown in FIG. 16

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The current invention proposes to provide a methodology employing controlled photoperiod light exposure to keep the plant live and healthy during shipping and maintains the plant's vegetative or flowering growth cycle for longer period of time.

Live plants adorn our homes, businesses and everyday surroundings. There are many types of plants, such as indoor plants, flower bearing plants or decorative plants which are used widely along homes, offices or other residential spaces. The journey through which these live plants take to reach these destinations is long and life-threatening. These plants may travel thousands of miles, from faraway countries, on ships, trains and trucks and endure long durations of travel without interventional care. Live plants require moisture and light in order to survive the journey. Such plants are generally transported in containers having water or soil. During packing, transportation, and unpacking, plants fall over, causing their precious water or soil to spill. Having a reduced water or soil supply puts the plant at risk of failing to survive the long journey. Once packed in an enclosed carton such as a cardboard box for shipping, plants are usually in complete darkness, deprived of light which is required for plant survival and growth. As a result, many plants perish before arriving at their final destination, the home, office, or retail store.

Even those plants that survive the journey to the destination being shipped to, prolonged periods of light deprivation will stimulate some flowering plants into entering their flowering growth cycle pre-maturely, severely limiting the potential future vegetative growth of the plant.

Therefore, there is a need felt for a container system that can hold and transport a live plant without effecting the plant's vegetative or flowering growth cycle.

The current invention in its preferred embodiment aims to work in following way. The live plant container apparatus consists of following segments including Opaque container body which is termed as TUBE (1), Interior restriction flange (15), Main on/off switch (2), Photoperiod selection switch (3), LED lights (4), Internal battery compartment (5), Power on indicator (6), Top lid assembly which is termed as LID-1 (7), Rooting medium retainer which is termed as RETAINER (10), Rooting medium retainer vent holes (8), Rooting medium retainer extrusion posts (9), Rooting medium retainer stem slot (11), Rooting medium of live plant with showing extruding roots (12), Stem of example live plants (13) and Bottom lid which is termed as LID-2 (14).

An opaque tubular container body which is termed as TUBE (1) and can be shaped in circular or rectangular tube form with a length of 10-50 cm and cross-sectional diameter of 3-30 cm. The TUBE has an interior restriction flange (15) which is positioned 3-20 cm from one end of the tube. This flange acts as a stopper to prevent the rooting medium retainer (10) from sliding inside the tubular body. The lower end of the TUBE closest to the interior flange is hereafter referred to as the short end, with the opposite end referred to as the long end.

A top lid assembly which is termed as LID-1 (7) is presented, containing an internal battery compartment (5) and battery powered LED lights (4) on the bottom of the lid, which will emit a light on the inside the TUBE when attached to the long end when powered on. There is a main power on/off switch (2) on top of the lid. Moreover, there is a switch which controls the photoperiods (3) as required i.e. 18 hours light/6 hours darkness in a 24 hour cycle for vegetative growth cycle, or 12 hours light/12 hours darkness in a 24 hour cycle for flowering growth cycle. On the top of the lid there is an indicator (6) which illuminates when the light on the bottom of the lid is powered on.

Moreover, it is further proposed to include additional features in the assembly in upcoming apparatus advancements. It is proposed to add increased functionalities such as a recharging receptacle, a power remaining indicator and current photoperiod cycle indicator showing how many hours of light remaining in the current set photo period.

As per further embodiment of the invention a disc shaped propagation rooting medium retainer which is termed as RETAINER (10), which is shaped to match the largest interior dimension of the tubular body is added. The RETAINER has a stem slot (11) which allows to accommodate the stem of the live plant (13) and prevent damage to the live plant during the installation or removal process.

The RETAINER has a series of small holes (8) for ventilation. The RETAINER further has 2 half circular holes slots on opposite sides along the edge, for easy gripping with fingers during the installation and removal process. The RETAINER has 4 tubular extrusion posts on one side (9), arranged in a square configuration, for the purpose of securing the propagation rooting medium. These can be made to different sizes (length, diameter, position), according to the size of the live plant's propagation rooting medium.

A bottom lid which is termed as LID-2 (14), is attached to the short end of the TUBE (1), that when secured, holds the propagation rooting medium in place between LID-2 (14) and the RETAINER (10), thus securing the centered position of the live plant's propagation rooting medium (12) inside the container. Furthermore, when LID-1 (7) and LID-2 (14) are attached, and the container is sealed with the plant inside, humidity is maintained inside the container and no moisture is lost to outside the container.

Figure 20:
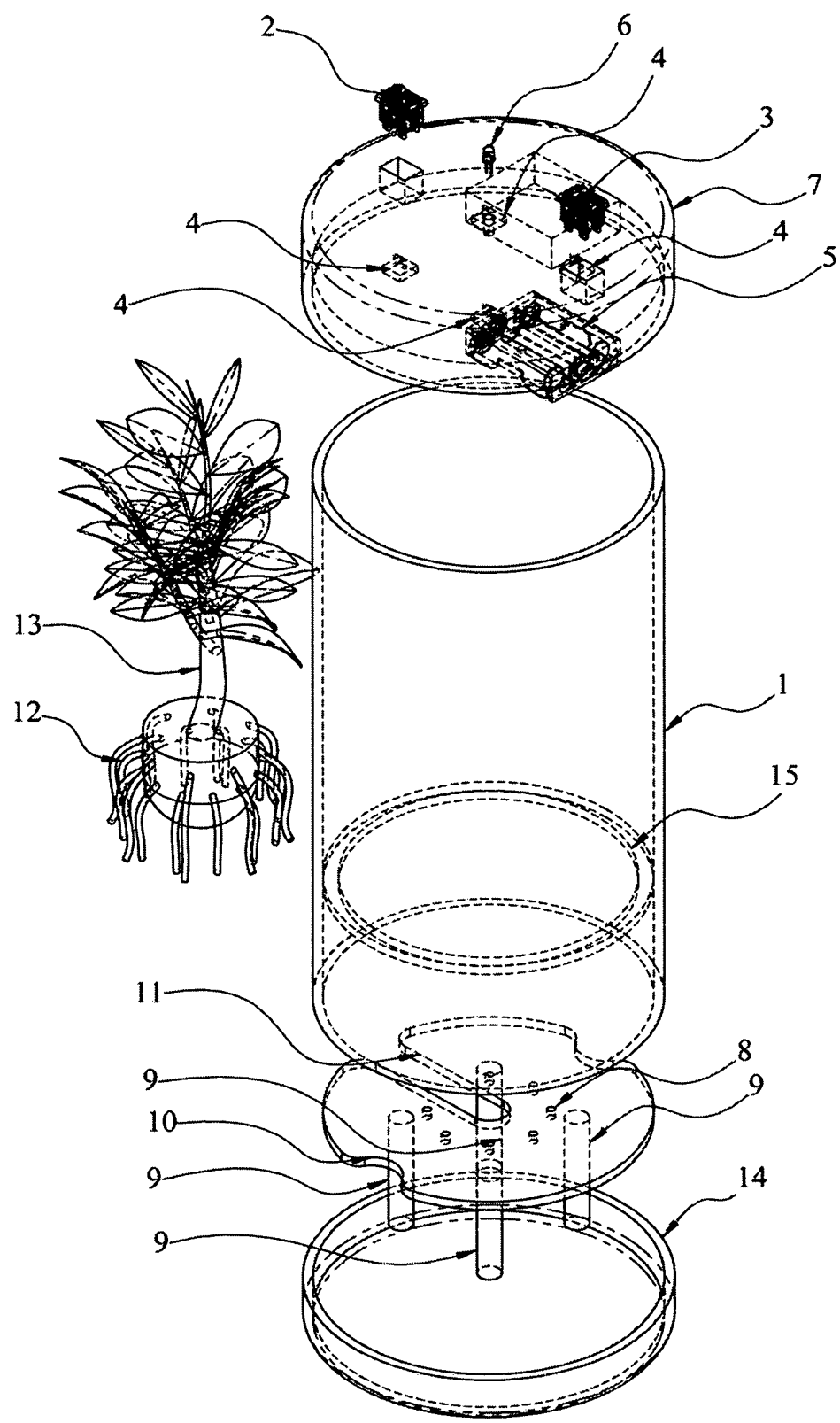
FIG. 20 is the front elevational view of the present invention showing parts thereof.
Figure 21:
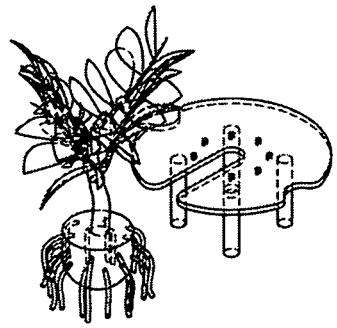
FIG. 21 is the front elevational view of the example live plant paired with propagation rooting medium retainer of the present invention.

To explain the figures further FIG. 20 shows elevated RETAINER above the propagation rooting medium of the live plant, and slide the stem slot of the RETAINER over the stem of the live plant until the stem is in the middle of the RETAINER, as illustrated on FIG. 21.

Figure 22:
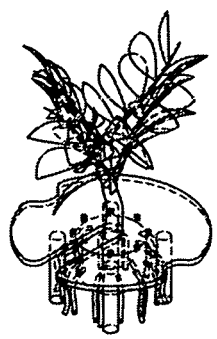
FIG. 22 is the front elevational view of the example live plant fitted with the propagation rooting medium retainer of the present invention.

FIG. 22 shows the live plant's propagation rooting medium which is secured between the 4 extrusion posts on the bottom of RETAINER, arranged in square configuration. The plant is secured by pressing the RETAINER down onto the rooting medium so that the rooting medium is secured between the 4 extrusion posts. The RETAINER has a series of small holes (8) for ventilation. The RETAINER further has 2 half circular holes slots on opposite sides along the edge, for easy gripping with fingers during the installation and removal process. The RETAINER has 4 tubular extrusion posts (9) on one side, arranged in a square configuration, for the purpose of securing the live plant's propagation rooting medium. These can be made to different sizes (length, diameter, position), according to the size of the propagation rooting medium used.

Figure 23:
FIG. 23 is the front elevational view showing the example live plant fitted with the propagation rooting medium retainer, inserting into the container body of the present invention, with bottom of the container facing upwards.

FIG. 23 discloses the RETAINER and live plant assembly inserted into the short end of the TUBE with LID-1 attached to the long end. The opaque container body having an interior restriction flange has a rooting medium retainer to hold the plant in an upright and stable position. The rooting medium retainer has vent holes to provide the easy inflow and outflow of air and has rooting medium retainer extrusion posts arranged in a square configuration, for the purpose of securing the propagation rooting medium.

Figure 24:
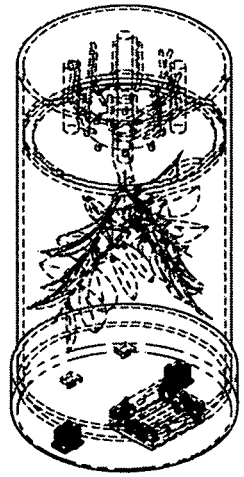
FIG. 24 is the front elevational view showing the example live plant fitted with the propagation rooting medium retainer, seated inside the container body of the present invention, with bottom of the container facing upwards.

FIG. 24 discloses the assembly setup which makes sure that the RETAINER sits flush against the interior restriction flange inside the TUBE.

Figure 25:
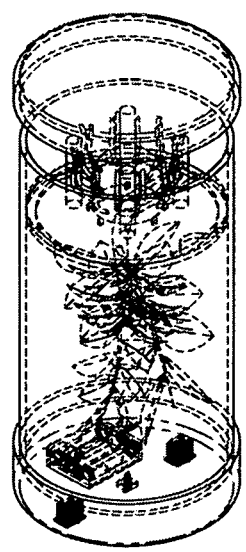
FIG. 25 is the front elevational view showing the bottom lid, fitting onto the container body of the present invention, with bottom of the container facing upwards.

FIG. 25 discloses the LID-2 (14) attached to the short end of the TUBE (1). The TUBE is an opaque container body (1) with the LID-1 (7) attached to the long end of the TUBE. The bottom LID-2 (14) is attached to the short end of the TUBE to ensure that the stem of live plant remains in a tight, centered and upright position inside the TUBE, by securing the propagation rooting medium between the RETAINER (10) and the LID-2 (14).

Figure 26:
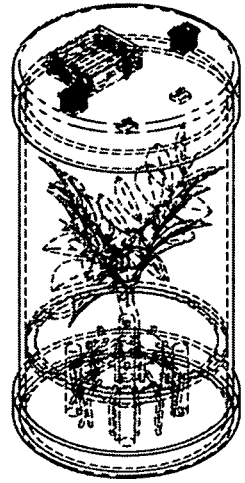
FIG. 26 is the front elevational view showing the present invention with the example live plant fitted inside.

Furthermore, the FIG. 26 shows the complete placement of the live plant container assembly in an upright position with the LID-1 facing upwards, turn on power and select desired photoperiod selection through the top mounted switches on top of the LID-1. The image shows the live plant in an opaque container body which is termed as TUBE with interior restriction flange (15). There is a main on and off switch (2) and a photoperiod selection switch (3) with LED lights (4) to show the photoperiod setup. The batteries are to supply the power to container secured within an internal battery compartment (5). The top lid assembly LID-1 (7) and bottom lid LID-2 (14) are present at the long end and short end of the TUBE respectively. The RETAINER (10) has 4 rooting medium retainer extrusion posts (9) and rooting medium retainer vent holes (11) to hold the live plant, including its propagation rooting medium within the container securely, while ensuring inflow and outflow of air to the live plant's propagation rooting medium, within the TUBE.

While a specific embodiment has been shown and described, many variations are possible. With time, additional features may be employed. The particular shape or configuration of the components of the container apparatus, or the interior configuration may be changed to suit the system or equipment with which it is used, such as to allow for multiple live plants to be contained and secured within the same apparatus. It is also proposed to form the individual containers secured together to form groups of containers, with each individual container becoming a modular unit of a group of connected containers.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A container for supporting, storing and transporting live plants above ground working on the phenomena of controlled photoperiod light exposure, said container comprising:
    an opaque tubular container body;
    a top lid;
    a bottom lid; and
    a disc shaped propagation rooting medium retainer, the retainer comprising:
        a stem slot which accommodates the stem of the live plant and prevents damage to the live plant during the installation or removal process;
        a series of holes for ventilation;
        two half circular holes on opposite sides along the edge for gripping during installation and removal; and
        four tubular extrusions on one side, arranged in a square configuration, for securing the live plant's propagation rooting medium, wherein the retainer is shaped to match the largest interior dimension of the tubular body.

2. The container of claim 1, wherein the opaque tubular container body has an interior restriction flange that acts as a stopper to prevent the disc shaped propagation rooting medium retainer from sliding freely inside the opaque tubular container body.

3. The container of claim 1, wherein the top lid includes:
    a battery powered light source that emits light within the opaque tubular container body;
    a power switch to turn on and turn off the light source;
    an indicator to notify whether the light source is turned on or turned off; and
    a switch to control photoperiods.

4. The container of claim 1, wherein the top and the bottom lids seal the live plant inside the opaque tubular container body to maintain humidity and prevent loss of moisture.

* * * * *